United States Patent Office 3,100,103
Patented Aug. 6, 1963

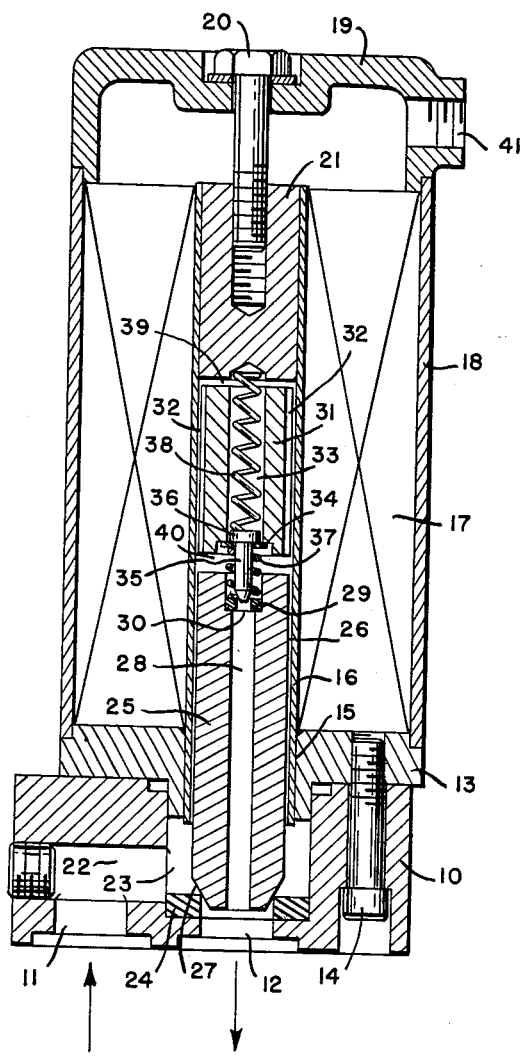

3,100,103
ELECTRO-MAGNETICALLY ACTUATED PILOT
AND MAIN VALVE
Robinson D. Bullard, Box 519, Springfield, Vt.
Filed June 19, 1959, Ser. No. 821,499
6 Claims. (Cl. 251—30)

The present invention relates to valves, and particularly to a new and improved solenoid operated valve.

An object of the invention is to provide a solenoid valve requiring a relatively small amount of electric power to operate it even though it handles relatively large volumes of fluid at relatively high pressures.

Another object of the invention is to provide such a valve in which the main closure member is influenced by several conditions obtaining in the valve which affect its opening and closing.

Another object of the invention is to provide such a valve in which a main closure member is acted upon by the magnetic flux of the solenoid to effect its opening.

Another object of the invention is to provide such a valve which is extremely sensitive and yet capable of handling large volumes of fluid over wide pressure ranges.

Another object of this invention is to provide a pilot-operated solenoid valve which can operate regardless of whether there is a pressure differential through the valve.

A further object of the invention is to provide such a valve in which a compound armature is provided including as one part thereof the main valve closure per se.

One aspect of the invention may be to provide a valve body having an inlet and an outlet therein. A hollow wound magnetic coil may be located on the valve body in a manner to accommodate a thin-walled tube centrally thereof, the interior of which may be in communication with the pressure fluid to be handled by the valve. A fixed armature and two aligned, movable armatures may be located within the coil. The movable armatures may be separated from the walls of the tube by a small annular air space. The movable armature farthest from the fixed armature may be hollow and have its lower end formed as a valve plunger for cooperation with a mating valve seat within the body. The other movable or intermediate armature may be located between the fixed and the above described movable armatures, and it may include a support for a pilot valve stem that may close off the inner end of the hollow armature.

In another aspect of the invention, the intermediate armature may be freely supported by resilient means between the fixed and lower armatures in a manner to provide a smaller gap between it and the fixed armature than exists between it and the lower armature.

In another aspect of the invention, the pilot valve stem supported by the intermediate armature may normally engage a seat within the hollow lower armature, and this seat may define an orifice having a cross-sectional area greater than the annular area between the lower armature and the thin-walled tube within which it is located.

In still another aspect of the invention, the design of the resilient means that floatingly supports the intermediate armature between the fixed and lower armatures, as well as the design of all of the armatures may be such that a relatively small amount of electrical energy is required in the coil to effect the upward movement of the floating armature, thereby to open the pilot valve.

If there is present a higher pressure at the inlet than at the outlet, this pressure causes the lower armature to act as a fixed armature so that upon energizing the coil, the intermediate armature rises, causing opening of the pilot valve, thereby establishing communication between the outlet and the top of the lower armature. Accordingly, the pressure holding the lower armature decreases and three conditions prevail which combinedly raise the lower armature, opening the main closure of the valve. These three conditions include the drag of the fluid on the lower armature as it flows through the annular space between it and the tube; the flux density acting to move the lower armature toward the coil center; and, the pressure acting on the effective surface of the lower armature that is exposed to the inlet pressure.

If there is no pressure drop through the valve, energizing the coil will cause both the intermediate and the lower armature to rise due to the flux density produced by the energized coil.

De-energizing the coil will cause the resilient supporting means of the intermediate armature to force it and the lower armature to a closed position regardless of the presence or absence of a pressure drop through the valve.

The above as well as other objects and novel features of the invention will become apparent from the following specification and accompanying drawing which is merely exemplary.

In the drawing, the FIGURE is a cross-sectional elevational view of a solenoid valve to which the principles of the invention have been applied.

Referring to the drawing, the principles of the invention have been shown as applied to a valve including a body 10 having an inlet port 11 and an outlet port 12. A plate 13 may be fixed to the top of body 10 by bolts 14 or the like, and it may include a central passage 15 within which a thin-walled tubular member 16 of non-magnetic material may be fixedly mounted. A coil 17 may be wound on the tubular member 16 and an outer tubular case 18 may surround the coil 17.

A cover 19 may be fixed to the top of tubular case 18 by a screw 20 that may be threaded into a ferrous metal armature 21 that may be fixedly mounted at the top of the tubular member 16 for a purpose to be described later.

The body 10 may include a passage 22 leading from the inlet port 11 to a chamber 23 that is in communication with the exhaust port 12. A valve seat 24 may be mounted within body 10 and it may cooperate with a movable armature in the form of a valve stem 25 of ferrous metal that is adapted to fit within the tubular member 16 with a small annular space 26 therebetween. The valve stem 25 may be provided with a tapered portion 27 adapted to mate with the seat 24 to interrupt the flow of fluid through the valve. It may also include an axial passage 28 and a valve seat 29 near the upper end thereof forming an orifice 30 therein having a cross-sectional area that is greater than the annular area 26.

An intermediate armature 31 of ferrous metal may be located between the fixed armature 21 and the lower armature 25. It may also freely ride within the tubular member 16, and one or more passage 32 may extend axially along its periphery to permit free passage of fluid around, above and below it. The armature 31 may include an axial passage 33 therethrough. A collar 34 may be fixed to armature 31 at the lower end of the passage 33 for supporting a pilot valve stem 35 by engagement between a head 36 of the latter and the collar 34 to thereby provide a telescoping arrangement between the stem 35 and armature 31.

A spring 37 may be located between the collar 34 and the valve seat 29, and another spring 38 may be located within the passage 33 in engagement with the head 36 of pilot valve stem 35 and the lower end of the fixed armature 21. The design of springs 37 and 38 as well as the length, mass and position of the armatures 21, 31 and 25 may be such that upon energizing coil 17, armature 31 and collar 34 will always move upwardly moving the stem 35 up with it to cause pilot stem 35 to open orifice 30 to establish communication between the interior of the tubular member 16 and the passage 28.

While it is evident that many variations in the proportions of the parts may be made, and the dimensions of gap 39 between the armatures 21 and 31, and gap 40 between armatures 31 and 25 will correspondingly vary, it has been found that with a valve having substantially the proportions shown in the drawing, gap 39 should be considerably smaller than gap 40 and in the neighborhood of about one-third that of gap 40. In any instance, the construction, design and arrangement of the parts should be such that armature 31 will always rise toward armature 21 when coil 17 is energized, and not descend toward armature 25.

The cap 19 may be provided with an inlet 41 through which the terminals of the coil 17 may extend.

With the apparatus in the condition shown in the drawing, and assuming that the inlet pressure exceeds the outlet pressure, fluid under pressure passes upwardly through the annular passage 26 into the gap 40. It also will flow upwardly through the passages 32 into gap 39, thence into passage 33, acting on head 36 holding stem 35 in sealed relation to seat 29. Under these conditions, the forces acting downwardly on armature 31 include that due to the fluid acting on the entire cross-sectional area thereof including that of head 36 and, in addition, that due to spring 38. The forces acting upwardly on armature 31 include that due to the pressure fluid acting on the effective area of the bottom of armature 31, which is the same as the top less the cross-sectional area of stem 35, that due to spring 37, and that due to the pressure fluid acting on the effective area of the tapered portion of the pilot valve stem 35 above the orifice 30.

The forces acting on armature 25 to maintain it in its lower position where port 12 is closed include the pressure fluid acting on the top effective surface of armature 25 less the pressure fluid acting on the projected area of tapered portion 27 that is exposed to the inlet pressure. Accordingly, this pressure differential causes armature 25 to initially act as a fixed armature and upon energizing coil 17, armature 31 moves upwardly and since collar 34 is fixed to armature 31, pilot stem 35 is raised, opening orifice 30. Immediately the pressure within tubular member 16 above armature 25 drops since the cross-sectional area of orifice 30 is so much greater than the annular area 26 that fluid above armature 25 exhaust through passage 28 before it can be replenished through annular passage 26.

Immediately three forces act to raise armature 25 and open port 11 to port 12. As the fluid flows upwardly through annular passage 26 to replenish that exhausted from gap 40 to passage 28, it causes a drag effect on the armature 25, tending to raise it. Elimination of the pressure fluid above armature 25 causes the flux of energized coil 17 to tend to cause armature 25 to move toward the center of the coil 17. Finally, the inlet pressure fluid acting on the projected area of tapered portion 27 that is exposed to the inlet pressure acts to force armature 25 upwardly. Due to these three conditions, armature 25 rises, establishing communication between ports 11 and 12.

Should there be no pressure drop through the valve, i.e., inlet and outlet pressure being the same, then there will be no fluid pressure forces tending to hold the armature 25 downwardly, and it will be held down only by the action of the spring 38 and its own weight. In such a case, energization of coil 17 will cause both armatures 25 and 31 to move upwardly. From the foregoing it is evident that the valve may be operated without the presence of a pressure drop through the valve.

Although the various features of the new and improved valve have been shown and described in detail to fully disclose one embodiment of the invention, it will be evident that numerous changes may be made in such details, and certain features may be used without others without departing from the principles of the invention.

What is claimed is:

1. A solenoid operated valve comprising in combination, a body; an inlet to said body; an outlet from said body; a valve seat between said inlet and outlet; a reciprocable main closure made from magnetizable material adapted to cooperate with said valve seat to interrupt the flow of fluid through said valve; a solenoid winding surrounding said main closure; means responsive to fluid pressure acting within said inlet for causing said main closure to seat; and means independent of, and separate from said main closure and responsive to the energizing of said solenoid winding for rendering ineffective said pressure responsive means, whereby the flux generated between said coil and said main closure by the energizing of said solenoid winding causes the movement of said main closure away from said valve seat in said body.

2. A solenoid operated valve comprising in combination, a body; an inlet to said body; an outlet from said body; a valve seat between said inlet and outlet; a reciprocable main closure made from magnetizable material adapted to cooperate with said valve seat to interrupt the flow of fluid through said valve; a solenoid winding surrounding said main closure; means responsive to fluid pressure acting within said inlet for causing said main closure to seat; and means independent of, and separate from said main closure and responsive to the energizing of said solenoid winding for rendering ineffective said pressure responsive means, whereby the flux generated between said coil and said main closure by the energizing of said solenoid winding and the flow of pressure fluid incident to the rendering ineffective of said pressure responsive means causes the movement of said main closure away from said valve seat in said body.

3. A solenoid operated valve comprising in combination, a body; an inlet to said body; an outlet from said body; a valve seat between said inlet and said outlet; a reciprocable main closure made of magnetizable material adapted to cooperate with said valve seat to interrupt the flow of fluid through said valve; a solenoid winding surrounding said main closure in such a manner that said main closure acts as a movable armature within said winding; a stationary armature within said winding; a movable armature between said main closure and said stationary armature; pilot valve means telescopingly supported by said movable armature and cooperating with pilot valve seat means within passageway means in said main closure that communicates with the outlet from said body for normally causing pressure fluid acting within said inlet to maintain said main closure seated on said valve seat; resilient means between said stationary armature and said movable armature and between the latter and said main closure for maintaining predetermined air gaps between the movable armature, the stationary armature and the main closure; and means responsive to the energizing of said solenoid winding for causing said movably mounted armature and said pilot valve means to move toward said stationary armature to thereby render ineffective said pilot valve means, whereby the flux generated between said coil and said main closure by the energizing of said solenoid winding causes the movement of said main closure away from said valve seat.

4. In a solenoid operated valve, a body; an inlet to said body; an outlet to said body; a valve seat between said inlet and outlet; a hollow tube of non-magnetic material; a solenoid winding surrounding said hollow tube; a hollow armature including passageway means therethrough and communicating with said outlet, mounted within said tube for reciprocable movement and providing a small annular space between said tube and armature; a closure surface on said armature adapted to cooperate with said valve seat; a stationary armature within said tube; a movable armature within said tube between said fixed armature and the armature having a closure surface; a pilot valve telescopingly supported by said movable armature for movement with, as well as relatively to said movable armature and normally held in position to prevent communication between the interior of said hollow armature and the annular space surrounding it and resilient means between said stationary armature and said movable armature, and between the latter and said hollow armature, the construction and arrangement of said movable armature being such that a larger gap exists between said movable armature and said hollow armature than exists between said movable armature and said fixed armature.

5. In a solenoid operated valve, a body; an inlet to said body; an outlet to said body; a valve seat between said inlet and outlet; a hollow tube of non-magnetic material; a solenoid winding surrounding said hollow tube; a first hollow armature including passageway means therethrough and communicating with said outlet, mounted within said tube for reciprocable movement and providing a small annular space between said tube and armature; a closure surface on said armature adapted to cooperate with said valve seat; a stationary armature within said tube; a second hollow armature within said tube between said stationary armature and said first hollow armaure; a pilot valve supported within said second hollow armature for movement with, as well as relatively to said hollow armature; a spring acting between said stationary armature and said valve; another spring acting between said hollow armatures tending to separate the same; and a pilot valve seat in said first hollow armature, the construction and arrangement of said springs and pilot valve being such that when said solenoid winding is de-energized, said pilot valve is seated against said pilot valve seat and a greater gap exists between said first and second hollow armatures than exists between said second hollow armature and said stationary armature.

6. In a solenoid operated valve, a body; an inlet to said body; an outlet to said body; a valve seat between said inlet and outlet; a hollow tube of non-magnetic material; a solenoid winding surrounding said hollow tube; a first hollow armature including passageway means therethrough and communicating with said outlet, mounted within said tube for reciprocable movement and providing a small annular space between said tube and armature; a closure surface on said armature adapted to cooperate with said valve seat; a stationary armature within said tube; a second hollow armature within said tube between said stationary armature and said first hollow armature; a pilot valve supported within said second hollow armature for movement with, as well as relatively to said hollow armature; a spring acting between said stationary armature and said valve; another spring acting between said hollow armatures tending to separate the same; a pilot valve seat in said first hollow armature, the construction and arrangement of said springs and pilot valve being such that when said solenoid winding is de-energized, said pilot valve is seated against said pilot valve seat and a greater gap exists between said first and second hollow armatures than exists between said second hollow armature and said stationary armature; and means for the passage of pressure fluid to the gap between said stationary and second armatures.

References Cited in the file of this patent

UNITED STATES PATENTS

| | | |
|---|---|---|
| 957,029 | Bassett et al. | May 3, 1910 |
| 1,807,191 | Boyle | May 26, 1931 |
| 2,181,423 | Gille | Nov. 28, 1939 |